United States Patent
Lee et al.

(10) Patent No.: US 9,489,718 B2
(45) Date of Patent: Nov. 8, 2016

(54) DISPLAY APPARATUS AND IMAGE PROCESSING METHOD THEREOF WHICH DECODE AN IMAGE IN UNIT OF MINIMUM CODED UNIT

(71) Applicant: SAMSUNG ELECTRONICS CO., LTD., Suwon-si (KR)

(72) Inventors: Tae-young Lee, Suwon-si (KR); Kee-won Joe, Seoul (KR); Cheul-hee Hahm, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 228 days.

(21) Appl. No.: 14/286,120

(22) Filed: May 23, 2014

(65) Prior Publication Data

US 2015/0070396 A1    Mar. 12, 2015

(30) Foreign Application Priority Data

Sep. 9, 2013   (KR) .......................... 10-2013-0107861

(51) Int. Cl.
*G06T 3/40*     (2006.01)
*G09G 5/36*     (2006.01)

(52) U.S. Cl.
CPC ............. *G06T 3/4092* (2013.01); *G09G 5/363* (2013.01); *G09G 2320/0242* (2013.01); *G09G 2340/02* (2013.01); *G09G 2340/045* (2013.01)

(58) Field of Classification Search
CPC ........................ G06T 3/4092; G09G 2340/045
See application file for complete search history.

(56) References Cited

U.S. PATENT DOCUMENTS

| | | | | |
|---|---|---|---|---|
| 5,790,110 A | * | 8/1998 | Baker | ...................... G09G 5/39 345/536 |
| 2007/0110390 A1 | * | 5/2007 | Toma | ................... H04N 5/7605 386/240 |
| 2010/0040299 A1 | | 2/2010 | Noh et al. | |
| 2011/0213779 A1 | * | 9/2011 | Niemi | ..................... G06T 9/005 707/740 |

* cited by examiner

*Primary Examiner* — Jeffery A Brier
(74) *Attorney, Agent, or Firm* — Sughrue Mion, PLLC

(57) ABSTRACT

The display apparatus includes: a display; a decoder which decodes an image in unit of a MCU; a scaler which scales the decoded image; a memory which stores the scaled image; and a controller which controls the display to display the scaled image, sets an RAU structure of the image, and further stores in the memory image information corresponding to the RAU structure. Thus, even if a decoded and scaled image is zoomed in, the quality of the zoomed image may be maintained at a high level.

18 Claims, 5 Drawing Sheets

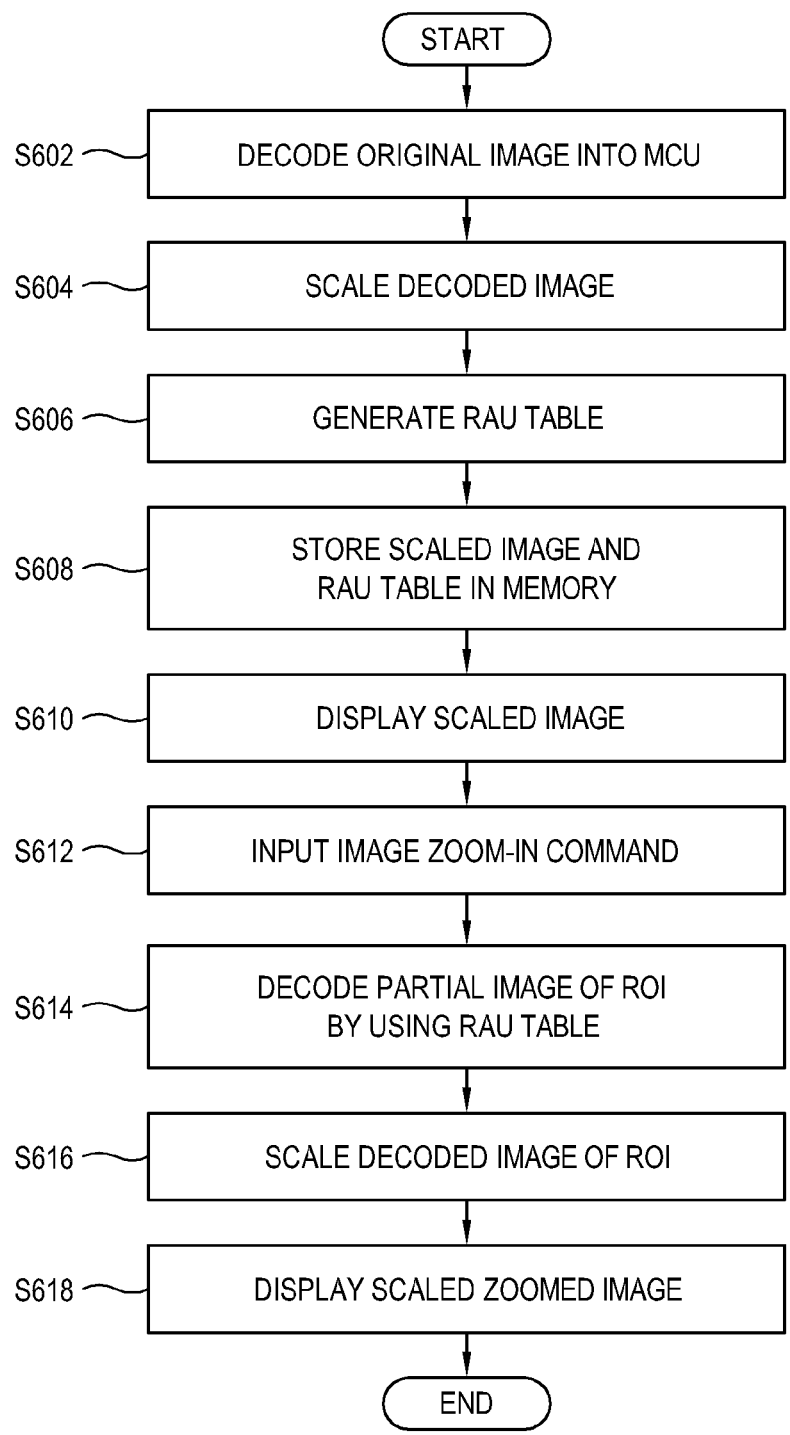

DISPLAY APPARATUS AND IMAGE PROCESSING METHOD THEREOF WHICH DECODE AN IMAGE IN UNIT OF MINIMUM CODED UNIT

CROSS-REFERENCE TO RELATED APPLICATION

This application claims priority from Korean Patent Application No. 10-2013-0107861, filed on Sep. 9, 2013 in the Korean Intellectual Property Office, the disclosure of which is incorporated herein by reference in its entirety.

BACKGROUND

1. Field

Apparatuses and methods consistent with exemplary embodiments relate to a display apparatus and an image processing method thereof, and more particularly, to a display apparatus and an image processing method thereof which decodes an image in unit of a minimum coded unit (MCU).

2. Description of the Related Art

A display apparatus processes an image file that is transmitted from the outside or stored in the display apparatus itself, and displays an image on a display panel based on the processed image file. Examples of the display apparatus include a television (TV) and a monitor. The TV displays an image file such as a JPEG file after performing various image processing processes such as decoding and scaling.

For example, after a JPEG file is decoded, scaled corresponding to a size of a display screen and color-converted corresponding to a display element, the image is stored as a temporary file in a memory, i.e., a display buffer. Typically, a resolution of the display screen is lower than a resolution of the original image file, and, thus, the image stored in the display buffer is down-scaled from the original image and a portion of image information in the image file is lost.

Further, the display apparatus may receive an instruction to zoom a particular region of the displayed image.

However, since the image stored in the display buffer is down-scaled and lost image information, the quality of the image may be deteriorated if the image is zoomed.

To prevent the image quality deterioration, decoding and color-converting of the original image may be performed again. However, in this case, the entire original image including an unnecessary region is decoded again regardless of the location of the zoomed area, and the processing speed becomes slower. Also, if the original image is stored in the memory to decode it later, too much of the memory capacity is taken up.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a display apparatus including: a display; a decoder which decodes an image in unit of a MCU; a scaler which scales the decoded image corresponding to a resolution of the display; a memory which stores the scaled image; and a controller which controls the display to display the scaled image, sets a random access unit (RAU) of the image, and further stores in the memory image information corresponding to the RAU.

The image information may be included in an RAU table which forms information for independently decoding a partial image corresponding to the respective RAUs.

The RAU may include a plurality of MCUs.

The RAU table may include, with respect to the RAU, first information showing a location of a first MCU in respective MCU rows in the RAU, and second information showing a quantized DC value of a last block in respective MCUs in a far right MCU column within the RAU.

The first information may include location information in a bitstream of an MCU in a first MCU column in the RAU.

The controller may control the decoder to selectively decode a partial image of the scaled image that needs to be processed additionally, by using the RAU table, if a user's input is received to additionally process the partial image of the scaled image.

The user's input may include a command for zooming in a partial image of the scaled image.

The decoder may selectively decode an RAU including a region that is displayed on a screen according to the zoom-in command.

The decoder may decode a partial image corresponding to the RAU by using first information of the RAU and second information of a prior RAU.

The controller may control the decoder to selectively decode a partial image of the scaled image that needs to be processed secondarily, by using the RAU table if a user's input is received to secondarily process the partial image of the scaled image.

The controller may control the display to read and display the scaled image stored in the memory if a user's input is received to secondarily process the scaled image.

One or more exemplary embodiments provide an image processing method of a display apparatus, the image processing method including: decoding an image in unit of a MCU; scaling the decoded image corresponding to a resolution of the display; setting an RAU of the image and storing image information corresponding to the RAU and the scaled image; and displaying the scaled image.

The storing may include storing the image information in an RAU table which forms information for independently decoding a partial image corresponding to the RAU.

The RAU may include a plurality of MCUs.

The RAU table may include, with respect to the RAU, first information showing a location of a first MCU in respective MCU rows in the RAU, and second information showing a quantized DC value of a last block in respective MCUs in a far right MCU column within the RAU.

The first information may include location information in a bitstream of an MCU in a first MCU column in the RAU.

The image processing method may further include receiving a user's input to additionally process the scaled image; and selectively decoding a partial image that needs to be additionally processed, by using the RAU table.

The user's input may include a command for zooming in a partial image of the scaled image.

The selectively decoding may include selectively decoding an RAU which includes a region that is displayed on a screen according to the zoom-in command.

The selectively decoding may include decoding a partial image corresponding to the RAU by using first information of the RAU and second information of a prior RAU.

The image processing method may further include receiving a user's input to secondarily process the scaled image;

and selectively decoding a partial image that needs to be secondarily processed, by using the RAU table.

The image processing method may further include receiving a user's input to secondarily process the scaled image; and reading the scaled image stored and displaying an image corresponding to the secondarily processed image.

BRIEF DESCRIPTION OF THE DRAWINGS

The above and/or other aspects will become more apparent by describing certain exemplary embodiments, with reference to the accompanying drawings, in which:

FIG. 5 is a flowchart showing an image processing method of the display apparatus according to an exemplary embodiment.

DETAILED DESCRIPTION OF EXEMPLARY EMBODIMENTS

Figure 1:
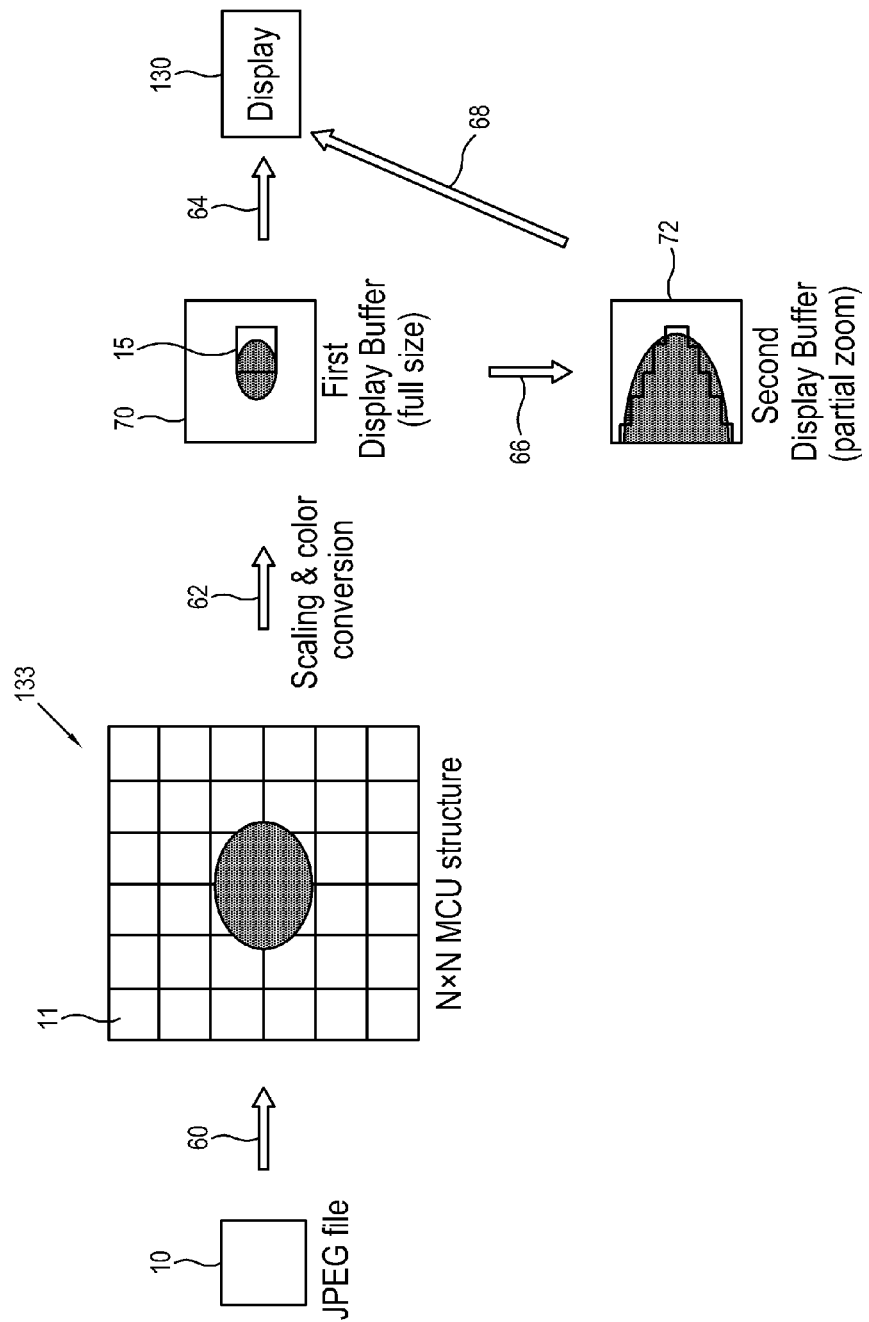
FIG. 1 illustrates an image processing process.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

As shown in FIG. 1, an image file 10 such as a JPEG file is decoded into a decoded image file 133 in unit of a MCU, the decoded image file 133 having an N×N number of MCUs 11 which are arranged in an array and shaped as squares (operation 60), and scaled corresponding to a size of a display screen and color-converted corresponding to a display element (operation 62). The scaled and color-converted image may be stored as a temporary file in a memory, i.e., in a first display buffer 70, and displayed on the screen (operation 64).

Referring to FIG. 1, upon receiving a user's command for zooming an image, a display apparatus reads the scaled image stored in the first display buffer 70, zooms a region of interest (ROI) 15 of the image, stores the zoomed partial image in a second display buffer 72 (operation 66), and displays the zoomed partial image on a display 130 (operation 68). If the image information was lost or reduced during the decoding and scaling operations, the zoomed image may be displayed with a reduced quality.

Figure 2:
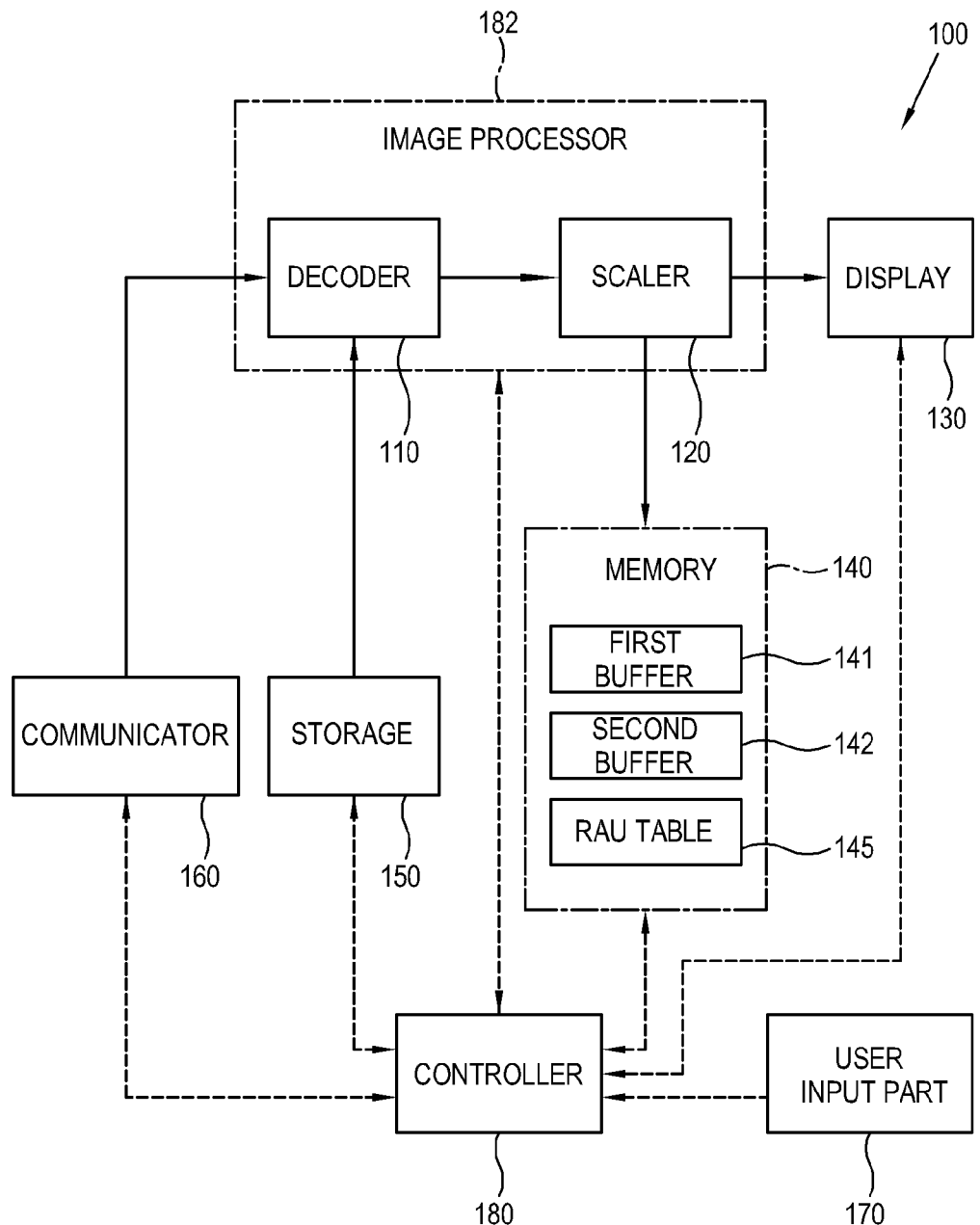
FIG. 2 is a block diagram of a display apparatus according to an exemplary embodiment.

FIG. 2 is a block diagram of a display apparatus 100 according to an exemplary embodiment.

The display apparatus 100 processes an image file, i.e., an image signal, according to a preset image processing process and displays an image based on the processed image signal. The display image includes a still image which is generated by processing an image file such as a JPEG file, and/or a video which is generated by processing a broadcasting signal or an image signal supplied from the outside such as a broadcasting station.

In the present exemplary embodiment, the display apparatus 100 is implemented as a TV which displays a broadcasting image based on broadcasting signals/broadcasting information/broadcasting data transmitted by a transmission equipment of a broadcasting station. However, the spirit of an exemplary embodiment is not limited to the aforementioned implementation of the display apparatus 100. Alternatively, the display apparatus 100 may apply to various types of implementations, e.g., a monitor which displays an image.

The type of the image that may be displayed by the display apparatus 100 is not limited to a broadcasting image and may further include video, still images, applications, on-screen display (OSD) based on signals and/or data supplied by various types of image supply sources (not shown), and a graphic user interface (GUI; hereinafter, to be also called "user interface (UI)") for controlling various operations.

As shown in FIG. 2, the display apparatus 100 includes a decoder 110 which decodes an image corresponding to a predetermined image format; a scaler 120 which scales the decoded image corresponding to a screen size, i.e., a resolution of a display 130; the display 130 which displays the scaled image thereon; a memory 140 which stores the scaled image; a storage 150 which stores various data; a communicator 160 which communicates with the outside in a wired and/or wireless manner; a user input part 170 which receives a user's input; and a controller 180 which controls the display apparatus 100. The decoder 110 and the scaler 120 may be included in an image processor 182.

The image processor 182 processes an image signal that is transmitted from the outside or stored in advance in the storage 150, according to a preset process. The processed image signal includes an image file such as a JPEG file. The image processor 182 performs various preset image processing processes with respect to an image signal. The image processor 182 outputs the processed image signal to the display 130 to display an image on the display 130.

To do so, the display apparatus 100 may further include a signal receiver (not shown) which receives an image signal from the outside and transmits the received image signal to the image processor 182. The signal receiver may vary corresponding to a standard of an image signal and an implementation type of the display apparatus 100. For example, the signal receiver may wirelessly receive radio frequency (RF) signals from a broadcasting station, or receive image signals in a wired manner according to standards such as composite video, component video, super video, SCART and high definition multimedia interface (HDMI). If the image signal includes a broadcasting signal, the signal receiver includes a tuner to tune the broadcasting signal per channel.

The image signal may be input by an external device, e.g., by a personal computer (PC), an audio/video (A/V) device, a smart phone, or a smart pad. The image signal may result from data that is received through a network such as the Internet. In this case, the display apparatus 100 may receive images through a network communication performed by the communicator 160. The image signal may result from data stored in the storage 150 as a non-volatile memory such as a flash memory or a hard disc. The storage 150 may be provided within or outside the display apparatus 100. If the storage 150 is provided outside the display apparatus 100, the display apparatus 100 may further include a connector (not shown) to which the storage 150 is connected.

The type of the image processing process performed by the image processor 182 is not limited to the decoding process performed by the decoder 110 and the scaling process performed by the scaler 120. For example, the image processing process may further include de-interlacing, frame refresh rate conversion, noise reduction for improving the quality of images, detail enhancement and line scanning.

The decoder 110 according to the present exemplary embodiment is implemented to decode a bitstream of an image file such as a JPEG file in unit of a MCU.

The image processor 182 may be implemented as a group of individual elements which perform the aforementioned processes independently, or as a system-on-chip (SoC) which integrates several functions.

The display 130 displays an image thereon based on the image signal processed by the image processor 182. The display 130 may be implemented as various displays including, without limitation, liquid crystal, plasma, light-emitting diode (LED), organic light-emitting diode (OLED), surface-conduction electron-emitter, carbon nano-tube, and nano-crystal as a flat panel display (FPD).

The display 130 may further include additional elements depending on its implementation type. More specifically, the display 130 may include a display panel (not shown) and a driver (not shown) to drive the panel. If the display 130 is implemented as a liquid crystal display panel (LCD) or an OLED panel, it may further include a backlight unit (not shown) to emit light to the panel.

The image processor 182 according to the present exemplary embodiment may further perform color conversion corresponding to the display element depending on the implementation type of the display 130.

The memory 140 stores decoded and scaled images. The memory 140 may include a plurality of buffers, i.e., a first buffer 141 and a second buffer 142, which store images as temporary files. The first and second buffers 141 and 142 are not divided physically, but identified as the elements storing a plurality of files in the memory 140 for convenience purpose only. In that regard, the memory 140 may further include third and fourth buffers to process additional image files. The memory 140 may further store an RAU table 145 (to be described later).

The memory 140 according to the present exemplary embodiment may include a volatile memory such as a static random access memory (SRAM), dynamic random access memory (DRAM) and a register, and a non-volatile memory such as a flash memory.

The storage 150 stores unlimited data by a control of the controller 180. The storage 150 is implemented as a non-volatile storage medium such as a flash memory and a hard disc drive. The storage 150 is accessed by the controller 180, and data stored in the storage 150 are at least one of read, recorded, amended, deleted, and updated by the controller 180.

The data stored in the storage 150 includes an operating system (OS) for driving the display apparatus 100 as well as various applications that may be executed on the OS, and image data and additional data. The display apparatus 100 according to the present exemplary embodiment may read original image files stored in the storage 150, and display images on the display 130 through the processing process of the decoder 110 and the scaler 120.

The communicator 160 communicates with the outside. The communicator 160 includes wired and/or wireless communication modules, devices, interfaces, etc., to perform network communication with the outside. The display apparatus 100 according to the present exemplary embodiment may read image files from the outside through the communicator 160, and display images on the display 130 through the processing process of the decoder 110 and the scaler 120.

The user input part 170 transmits various preset control commands or unlimited information to the controller 180 by a user's manipulation and input. The user input part 170 is implemented as a manipulation panel (not shown) including a button such as a menu key that is installed in an external side of the display apparatus 100, or a remote controller (not shown) that is separated/spaced from the display apparatus 100. If the user input part 170 is implemented as a remote controller, a method of transmitting a user's input by the user input part 170 to the controller 180 is not limited and may employ a wireless communication. The wireless communication includes an infrared (IR) communication and RF communication. In this case, the display apparatus 100 may receive signals corresponding to a user's input received through the user input part 170, through the communicator 160, and transmit the signals to the controller 180.

The controller 180 controls various elements of the display apparatus 100. For example, the controller 180 controls the image processor 182 to perform the image processing process, and performs a control operation corresponding to a command from the user input part 170 to thereby control overall operations of the display apparatus 100.

Figure 3:
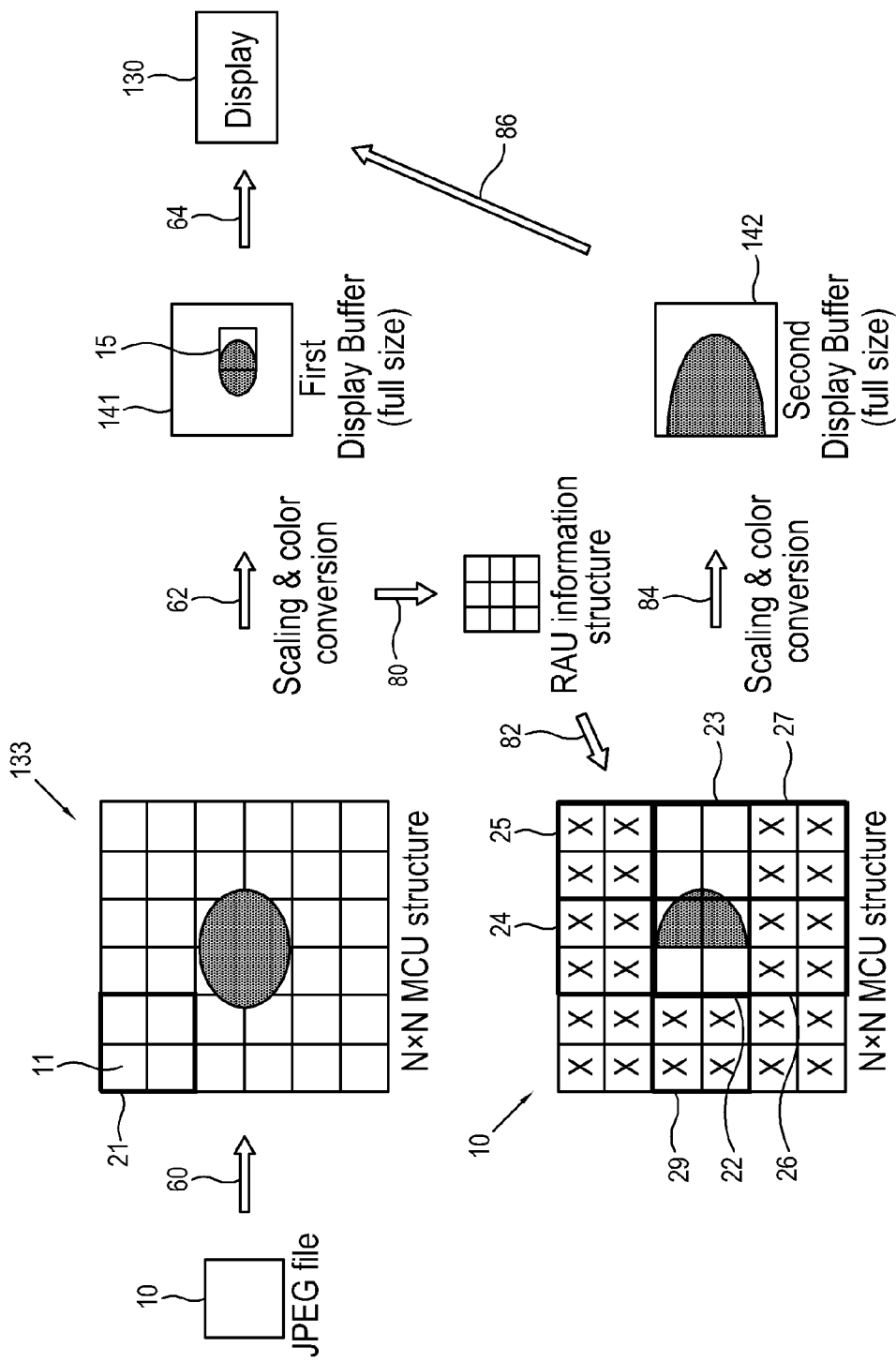
FIG. 3 illustrates an image processing process according to an exemplary embodiment.
Figure 4:
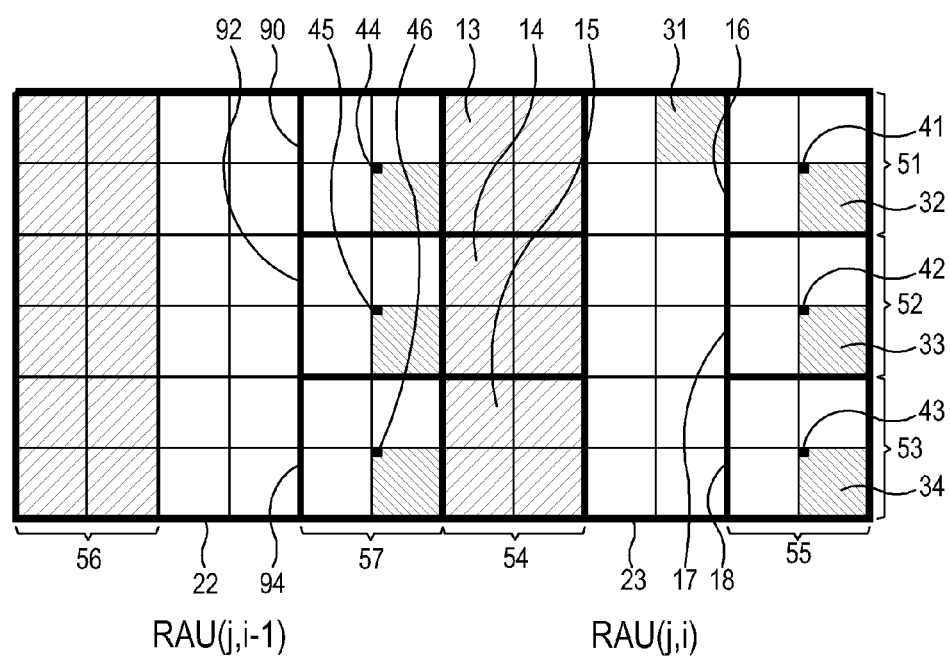
FIG. 4 is a detailed view of an RAU in FIG. 3.

FIG. 3 illustrates the image processing process according to an exemplary embodiment. FIG. 4 is a detailed view of an RAU in FIG. 3.

The decoder 110 decodes an image file 10 such as a JPEG file in unit of a MCU, thereby the decoded image having an N×N number of square-shaped MCUs 11 (operation 60). The number N of MCUs is a random positive number that is 1 or more, and is not limited to that shown in FIG. 3. The MCU structure may be generally 6×6, 8×8 or 16×16 format. Each of the MCUs 11 may include a plurality of blocks 31 (refer to FIG. 4).

FIG. 3 illustrates the JPEG file that is processed by the image processing process, but the image file processed according to the present exemplary embodiment is not limited to the JPEG file and includes all of image files that may be decoded per MCU.

The controller 180 controls the decoder 110 to perform the decoding operation through the MCU, sets an RAU information structure of the image (operation 80), and stores in the memory 140 image information corresponding to the RAU information structure as an RAU table. The RAU includes an M×R MCUs 11, as, for example, 2×2 as shown in FIG. 3. The numbers M and R of the RAUs are random positive numbers that are 1 or more. The numbers M and R are not limited to those shown in FIG. 3, and may be equal to or different from each other. An RAU (1,1) 21 located at the top left side of the image file 10 is a first RAU to be decoded, and is also called an initial RAU.

The controller 180 forms an RAU table 145 in a predetermined structure with image information corresponding to the RAU 21 and stores the RAU table 145 in the memory 140. The RAU table 145 includes information for independently decoding RAUs in a random location for respective RAUs 21, 22, 23, 24, 25, 26, 27, 29, etc.

More specifically, referring to FIG. 4, an RAU table 145 corresponding to an RAU (j, i) 23 may include position information of first MCUs 13, 14 and 15 in respective MCU rows 51, 52 and 53 (the first information) in the RAU (j, i) 23 in a bitstream of the image file, and quantized DC values 41, 42 and 43 of last blocks 32, 33 and 34 (second information) in respective MCUs 16, 17 and 18 in the far right MCU column 55 in the RAU (j, i) 23, in the decoding order of the image file. The first information is location information in the bitstream for all of the MCUs 13, 14 and 15 in the first MCU column 54 of the RAU (j, i) 23.

In case of a top left RAU (1, 1) 21 in the image file, a quantized DC value of the last block in respective MCU rows of the second information is 0 as a default.

The display apparatus 100 according to an exemplary embodiment stores the first and second information (RAU information) for the respective RAUs in the memory 140 when processing the image file, and if a part of the scaled image needs to be processed additionally, uses the stored RAU information and selectively decodes the RAU corresponding to a region of interest (ROI).

The image decoded by the decoder 110 is scaled by the scaler 120 corresponding to the size of the display screen, and color-converted corresponding to the display element (operation 62). The scaled and color-converted full size image is stored as a temporary file in the first buffer 141 in the memory 140. The full size image is displayed on a screen of the display 130 (operation 64).

A user may manipulate the user input part 170 and input a user's command to enlarge, i.e., zoom-in, a part of the image, i.e., an ROI 15 of the image displayed on the screen. The ROI 15 is a region which a user desires to zoom-in, and is a region displayed on the display 130 after zoom-in.

If an image zoom-in command is input by a user, the controller 180 controls the decoder 110 to selectively decode only a partial image of the original image corresponding to the RAUs 22, 23 of the ROI by using the RAU information stored in the RAU table 145 (operation 82). The decoder 110 decodes the partial image of the ROI in unit of the MCU.

More specifically, if the RAU (j, i) 23 in FIG. 4 is explained as an example, the decoder 110 decodes a partial image corresponding to the RAU 23 by using the first information of the RAU (j, i) 23 and second information of the prior RAU (j,i−1) 22, i.e., quantized DC values 44, 45 and 46 of the last blocks 90, 92, and 94 in the far right column 57 of RAU 22 which is adjacent the first column 54 of RAU 23, in the decoding order of the image file. That is, the location of the RAU (j, i) 23 which will be decoded in the bitstream of the image is determined according to the first information of the RAU (j, i) 23, and the RAU (j, i) 23 is read from the original image. The decoder 110 uses the quantized DC values 44, 45 and 46 of the second information of the prior RAU (j, i−1) 22 according to the decoding process for the image file to obtain actual quantized DC values of MCUs of the RAU (j, i) 23. Based on the actual quantized DC values of the MCUs which have been obtained as above, the decoder 110 decodes the partial image corresponding to the RAU (j, i) 23. The prior RAU (j, i−1) 22 constitutes a RAU corresponding to a prior location in the bitstream of the RAU (j, i) 23 to be decoded in the decoding order of the original image.

Likewise, in case of the RAU (j, i−1) 22, the decoder 110 decodes the partial image corresponding to the RAU (j, i−1) 22 by using the first information (location information in the bitstream of all MCUs of the first MCU row 56 in the RAU (j, i−1) 22 and the second information of the prior RAU (j, i−2) 22, for example, a RAU 29 corresponding to a prior location in the bitstream of the RAU 22 to be decoded in the decoding order of the original image.

If the ROI includes the initial RAU 21, the second information of the prior RAU needs not to be read, and the decoder 110 decodes the partial image by using the quantized DC value of 0 in the last block of respective MCUs in the far right MCU row of the initial RAU (1,1) 21 stored as a default value.

The partial image of the RAU (22, 23) decoded by the decoder 110 is scaled by the scaler 120 corresponding to the size of the display screen, and color-converted corresponding to the display element (operation 84). The scaled and color-converted partial image is stored as a temporary file in the memory, i.e., in the second buffer 141. The scaled and color-converted partial image is displayed on the screen of the display 130 (operation 86).

Accordingly, if the image that is displayed after being decoded and color-converted is zoomed, a high-resolution original image is read, decoded, scaled and then displayed. Thus, the quality of the zoomed image may be maintained. Since only the part corresponding to the ROI rather than the entire image is decoded again, the image may be processed promptly. Further, respective RAU information (first and second information) rather than the original image is stored as a table and thus it needs only a small memory capacity.

An exemplary embodiment shown in FIGS. 3 and 4 may reduce processing time by approximately 80% compared to the case where the entire original image is decoded again in the related art, as for example, when the image quality is to be high in the zooming operation.

If the partial image is decoded according to a zoom-in command, the decoder 110 according to an exemplary embodiment may further decode peripheral regions of the ROI, i.e., RAUs 24, 25, 26, and 27 shown in FIG. 3, which are adjacent to the RAUs 22 and 23 as well as the ROI. If the decoder 110 decodes the peripheral regions 24, 25, 26 and 27, upon a user's input for scrolling the image toward at least one of upward, downward, left, and right side while a zoomed image is displayed, the partial image stored in the second buffer 142 is read and displayed on the display 130 without an additional decoding process.

An exemplary embodiment shown in FIGS. 3 and 4 explains the decoding of the ROI to be zoomed when the image displayed on the display 130 is zoomed, but an exemplary embodiment is not limited to the zoom-in of the image, and may apply to the case where images should be decoded additionally after being decoded and scaled.

The display apparatus 100 according to an exemplary embodiment may receive a user's command to re-zoom (secondarily zoom) the zoomed partial image which is stored in the second buffer 142. For convenience purposes, a partial image stored in the second buffer 142 is called a first partial image and a first ROI; a partial image corresponding to a region displayed on the display 130 according to a user's re-zooming command is called a second partial image and a second ROI; a zoom-in to the first partial image is called a first zoom-in; and a zoom-in to the second partial image is called a secondary zoom-in.

The controller 180 of the display apparatus 100 according to an exemplary embodiment controls the decoder 110 to selectively decode only the second partial image corresponding to an RAU of the second ROI corresponding to the secondary zoom-in by referring to the RAU information stored in the RAU table 145, according to a user's secondary zoom-in command that is input through the user input unit 170. Details of the zoom-in method are the same as those which have been explained with reference to FIGS. 3 and 4.

The second partial image that is decoded by the decoder 110 is scaled by the scaler 120 corresponding to the size of the display screen, and color-converted corresponding to the display element. The scaled and color-converted second partial image is stored as a temporary file in a third buffer (not shown) of the memory 140. The scaled and color-converted second partial image is displayed on the screen of the display 130.

The display apparatus 100 according to an exemplary embodiment may read, scale, color-convert and display on the display 130 the part of the original image by using the information stored in the RAU table 145 corresponding to a user's consecutive tertiary or more zoom-in commands as well as the user's secondary zoom-in command.

By the foregoing decoding method, the display apparatus 100 according to an exemplary embodiment may maintain the quality of the zoomed image if the image is zoomed at a high zoom-in rate.

According to another exemplary embodiment, the display apparatus 100 may read, zoom and display on the display 130 the first partial image stored in the second buffer 142 without performance of an additional decoding process, according to the user's secondary or more zoom-in commands. In such case, a repetitive decoding process for consecutively zooming in the image is prevented, and thus a load to the display apparatus 100 may be reduced.

The display apparatus 100 according to an exemplary embodiment may receive a user's selection for decoding or not decoding the image with respect to the secondary or more zoom-in, and may selectively decode the partial image with respect to the secondary or more zoom-in according to a user's input. A user may select through the user input unit 170 whether to decode the image when the image is further zoomed after the secondary or more zoom-in, and as the case may be, may decode the original image by using the RAU table 145 with respect to up to a predetermined frequency of zoom-in (e.g. secondary zoom-in), and read, zoom and display the partial image mostly recently stored in the memory 140 with respect to from a predetermined frequency of zoom-in (e.g., tertiary zoom-in).

Hereinafter, an image processing method of the display apparatus 100 according to an exemplary embodiment will be described with reference to FIG. 5.

FIG. 5 is a flowchart showing the image processing method of the display apparatus 100 according to an exemplary embodiment.

As shown, the display apparatus 100 may decode the original image in unit of the MCU through the decoder 110 to display an image such as a JPEG file (operation S602). The image file which corresponds to the original image may be the file stored in the storage 150 or the file received from the outside through the communicator 160.

The scaler 120 scales the decoded image, corresponding to the resolution of the display 130 (operation S604). The image processor 182 may further color-convert the image corresponding to the display element of the display 130.

The controller 180 sets the RAU of the original image, and generates the RAU table 145 of the set RAU (operation S606). The RAU table 145 includes information of respective RAUs 21, 22 and 23 to independently decode the RAU in a random location, and the information may include the location information of the first MCUs 13, 14 and 15 in the respective MCU rows 51, 52 and 53 in the respective RAUs 21, 22 and 23 in the bitstream of the original image file (first information), and the quantized DC values 41, 42 and 43 of the last blocks 32, 33 and 34 in the respective MCUs 16, 17 and 18 of the far right MCU row 55 in the RAUs 21, 22 and 23 (second information).

The RAU table 145 is stored together with the full image scaled at operation S604, in the memory 140 (operation S608). The region which stores the scaled entire image may be called the first buffer 141 for convenience purpose.

The scaled image is displayed on the display 130 (operation S610).

The display apparatus 100 may receive a user's zoom-in command for the displayed image displayed (operation S612).

The controller 180 controls the decoder 110 to decode the partial image of the original image corresponding to the RAU of the ROI that is displayed after zoom-in, by using the RAU table 145 stored at operation S608, according to the input zoom-in command (operation S614). The decoder 110 decodes the partial image by using the first information of the RAU (j, i) 23 and the second information of the prior RAU (j, i−1) 22.

The scaler 120 scales the partial image that has been decoded at operation S614, corresponding to the resolution of the display 130 (operation S616). The image processor 182 may further color-convert the partial image corresponding to the display element of the display 130.

The image that has been scaled at operation S616 is displayed on the display 130 (operation S618).

According to an exemplary embodiment, even if a decoded and scaled image is zoomed in, the quality of the zoomed image may be maintained at a high level.

Also, only the ROI rather than the entire original image is decoded, and thus the image may be processed promptly and the load to the controller due to the image processing process may be reduced.

Also, only a part of information needed for decoding is stored in the memory, the thus image processing process may be performed by using only a small memory capacity.

Although a few exemplary embodiments have been shown and described, exemplary embodiments are not limited thereto. It would be appreciated by those skilled in the art that changes may be made in these exemplary embodiments without departing from the principles and spirit of the disclosure, the scope of which is defined in the claims and their equivalents.

What is claimed is:

1. A display apparatus comprising:
    a display;
    a decoder which decodes an image in unit of a minimum coded unit (MCU), the MCU comprising a plurality of blocks;
    a scaler which scales the decoded image;
    a memory which stores the scaled image; and
    a controller which controls the display to display the scaled image, sets a random access unit (RAU) structure of the image, and further stores in the memory an RAU table corresponding to information of the RAU structure, the RAU structure comprising a plurality of MCUs,
    wherein the controller is configured to control the decoder to decode a first partial image of the scaled image that is to be additionally processed, by using the RAU table, when a user's input is received to additionally process the first partial image of the scaled image.

2. The display apparatus according to claim 1, wherein the RAU table contains information for independently decoding a partial image which corresponds to respective RAUs.

3. The display apparatus according to claim 1, wherein the plurality of MCUs of the RAU structure are arranged in rows and columns, and the RAU table comprises:
    first information containing locations of first MCUs in respective rows of the RAU structure, and
    second information containing quantized DC values of last blocks in respective MCUs in a far right MCU column within the RAU structure.

4. The display apparatus according to claim 3, wherein the first information comprises location information in a bitstream of the first MCUs of a first MCU column in the RAU structure, in an image decoding direction.

5. The display apparatus according to claim 1, wherein the user's input comprises a command for zooming the first partial image of the scaled image.

6. The display apparatus according to claim 5, wherein the decoder decodes a respective RAU comprising a region that is displayed on a screen, according to a zoom-in command.

7. The display apparatus according to claim 6, wherein the decoder decodes the first partial image corresponding to the respective RAU by using the first information of the respective RAU and the second information of a prior RAU, in an image decoding direction.

8. The display apparatus according to claim 1, wherein the controller controls the decoder to decode a second partial image of the scaled image that is to be secondarily processed, by using the RAU table when the user's input is received to secondarily process the second partial image of the scaled image.

9. The display apparatus according to claim 8, wherein the controller controls the display to read and display the scaled image stored in the memory when the user's input is received to secondarily process the scaled image.

10. An image processing method of a display apparatus, the image processing method comprising:
    decoding an image in unit of a minimum coded unit (MCU), the MCU comprising a plurality of blocks;
    scaling the decoded image;
    setting an random access unit (RAU) structure of the image and storing an RAU table corresponding to information of the RAU structure and the scaled image the RAU structure comprising a plurality of MCUs;
    displaying the scaled image,
    receiving a user's input to additionally process the scaled image; and
    decoding a first partial image of the scaled image that is to be additionally processed, by using the RAU table.

11. The image processing method according to claim 10, wherein
    the RAU table contains information for independently decoding a partial image which corresponds to a respective RAU.

12. The image processing method according to claim 10, wherein the plurality of MCUs of the RAU structure are arranged in rows and columns, and the RAU table is configured to comprises:
    first information containing a location of first MCUs in respective MCU rows of the RAU structure, and
    second information containing quantized DC values of last blocks in respective MCUs in a far right MCU column within the RAU structure.

13. The image processing method according to claim 12, wherein the first information comprises location information in a bitstream of the first MCUs in a first MCU column in the RAU structure, in an image decoding direction.

14. The image processing method according to claim 10, wherein the user's input comprises a command for zooming the first partial image of the scaled image.

15. The image processing method according to claim 14, wherein the decoding comprises:
    decoding a respective RAU which comprises a region that is displayed on a screen according to a zoom-in command.

16. The image processing method according to claim 15, wherein the decoding comprises:
    decoding the first partial image corresponding to the RAU by using the first information of the RAU and the second information of a prior RAU, in an image decoding direction.

17. The image processing method according to claim 10, further comprising:
    receiving the user's input to secondarily process the scaled image; and
    decoding a second partial image that is to be secondarily processed, by using the RAU table.

18. The image processing method according to claim 17, further comprising:
    in response to the user's input to secondarily process the scaled image, reading the stored scaled image stored; and
    displaying an image corresponding to the secondarily processed image.

* * * * *